United States Patent
Kumazawa et al.

(12)

(10) Patent No.: US 6,210,645 B1
(45) Date of Patent: Apr. 3, 2001

(54) HONEYCOMB REGENERATOR

(75) Inventors: Kazuhiko Kumazawa, Nagoya; Wataru Kotani, Kasugai, both of (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 08/591,117

(22) Filed: Jan. 25, 1996

(30) Foreign Application Priority Data

Jan. 25, 1995 (JP) .................................................. 7-009729
Dec. 18, 1995 (JP) .................................................. 7-328772
Dec. 28, 1995 (JP) .................................................. 7-342634

(51) Int. Cl.[7] ............................. F22L 15/02; F28D 17/02
(52) U.S. Cl. ......................... 422/206; 501/134; 165/9.2; 165/905; 165/DIG. 37; 165/DIG. 42
(58) Field of Search .................................. 422/171, 206; 428/116; 502/439, 128, 134, 153; 501/119, 106; 165/9.2, 905, 901, 902, DIG. 31, DIG. 46, DIG. 396

(56) References Cited

U.S. PATENT DOCUMENTS

| 4,143,704 | * | 3/1979 | Kandakov et al. | ........... 165/DIG. 31 |
| 4,379,109 | | 4/1983 | Simpson | ................. 264/60 |
| 4,421,702 | | 12/1983 | Oda et al. | ............... 264/62 |
| 4,533,584 | | 8/1985 | Takeuchi et al. | ............... 428/116 |
| 4,767,731 | | 8/1988 | Asami et al. | . |

FOREIGN PATENT DOCUMENTS

| 2 545 917 A1 | 5/1984 | (FR) . |
| 58-26036 | 2/1983 | (JP) . |
| 4-251190 | 9/1992 | (JP) . |

* cited by examiner

Primary Examiner—Gary P. Straub

(57) ABSTRACT

A honeycomb regenerator is constructed by (a) honeycomb structural bodies arranged in a high temperature portion, in which a temperature is over 1250° C. during a normal operation, made of aluminum-titanate or a combination of aluminum-titanate and mullite, and (b) honeycomb structural bodies arranged in a low temperature portion, made of cordierite and/or mullite, or by (a) honeycomb structural bodies arranged in a high temperature portion, to which an exhaust gas having a high temperature is contacted, made of aluminum-titanate or a combination of aluminum-titanate and mullite, (b) honeycomb structural bodies arranged in a middle temperature portion made of alumina and (c) honeycomb structural bodies arranged in a low temperature portion made of one material or a combination of materials selected from a group of cordierite, mullite and a porcelain. The honeycomb regenerator according to the invention can perform a heat exchanging operation effectively even in an exhaust gas having a high temperature and also in an exhaust gas having a high temperature and a corrosive property.

9 Claims, 9 Drawing Sheets

Exhaust gas

Gas to be heated

HONEYCOMB REGENERATOR

BACKGROUND OF THE INVENTION

1. Field of the Invention

The present invention relates to a honeycomb regenerator for recovering a waste heat in an exhaust gas by passing the exhaust gas and a gas to be heated alternately therethrough, which is constructed by stacking a plurality of honeycomb structural bodies and especially relates to the honeycomb regenerator used in an exhaust gas having a high temperature or a corrosive exhaust gas having a high temperature.

2. Related Art Statement

In a combustion heating furnace used for an industries such as a blast furnace, an aluminum melting furnace, a glass melting furnace or the like, a regenerator used for improving a heat efficiency, in which a firing air is pre-heated by utilizing a waste heat of an exhaust gas, has been known. As such regenerators, Japanese Patent Laid-Open Publication No. 58-26036 (JP-A-58-26036) discloses a regenerator utilizing ceramic balls, and also Japanese Patent Laid-Open Publication No. 4-251190 (JP-A-4-251190) discloses a regenerator utilizing honeycomb structural bodies.

In the known regenerator mentioned above, at first an exhaust gas having a high temperature is brought into contact with the ceramic balls or the honeycomb structural bodies to store a waste heat of the exhaust gas in the regenerator, and then a gas to be heated having a low temperature is brought into contact with the thus pre-heated regenerator to heat the gas to be heated, thereby utilizing the waste heat in the exhaust gas effectively.

Among the known regenerators mentioned above, in the case of using the ceramic balls, since a contact area between the ceramic balls and the exhaust gas is small due to a large gas-flowing resistivity of the ceramic balls, it is not possible to perform a heat exchanging operation effectively. Therefore, there occurs a drawback such that it is necessary to make a dimension of the regenerator large.

Contrary to this, in the case of using the honeycomb structural bodies, since a geometrically specific surface thereof is large as compared with a volume thereof, it is possible to perform the heat exchanging operation effectively even by a compact body. However, in an actual industrial heating furnace such as a glass melting furnace and a ceramic firing furnace, an operating temperature becomes over 1400° C. Therefore, if a honeycomb regenerator constructed by cordierite honeycomb structural bodies, which are widely used in a field of automobiles as a catalyst carrier, is applied to the heating furnaces mentioned above, the cordierite honeycomb structural bodies become soft and in an extreme case melted. This is because a softening temperature of the cordierite honeycomb structural bodies is about 1400° C. In this case, the honeycomb regenerator cannot be used.

Moreover, in order to improve anti-corrosive properties, a prior art honeycomb regenerator is known, which is constructed by stacking anti-corrosive honeycomb structural bodies and cordierite honeycomb structural bodies. However, the honeycomb regenerator mentioned above cannot be used in a blasting furnace where the temperature reaches about 1300° C. and foreign substances such as an iron scale are included in an exhaust gas. For Example, if use is made of an alumina honeycomb structural body as the anti-corrosive honeycomb structural body, the alumina honeycomb structural body is not reacted with the iron scale, and thus it is no problem. However, in the blasting furnace, an abrupt temperature change occurs during a normal operation. In this case, the alumina honeycomb structural body is susceptible to breakage by the abrupt temperature change mentioned above, since alumina has a high thermal expansion coefficient and a low thermal shock resistance. Further, if the other anti-corrosive honeycomb structural bodies such as mullite, SiC are used, mullite and SiC have a high thermal expansion coefficient, and thus the honeycomb structural bodies are also susceptible to breakage due to an abrupt temperature change as is the same as the alumina honeycomb structural body. Moreover, in order to improve anti-corrosive properties, it is thought that the size of one honeycomb structural body is made small, but in this case a handling operation of the honeycomb regenerator becomes troublesome.

Further, in a heating furnace using a heavy fuel oil, SOx is generated due to a sulfur component included in the heavy oil and is reacts with a water component at a temperature under a dew point of SOx, so that a diluted sulfuric acid is generated. Therefore, if use is made of the cordierite honeycomb structural body in the atmosphere mentioned above, the cordierite honeycomb structural body is corroded.

SUMMARY OF THE INVENTION

An object of the present invention is to eliminate the drawbacks mentioned above and to provide a honeycomb regenerator which can perform a heat exchanging operation effectively even in an exhaust gas having a high temperature and in an exhaust gas having a high temperature and a corrosive property.

According to a first embodiment of the invention, a honeycomb regenerator for recovering a waste heat in an exhaust gas by alternately passing an exhaust gas and a gas to be heated therethrough, constructed by stacking a plurality of honeycomb structural bodies, compromising (a) honeycomb structural bodies arranged in a high temperature portion, in which a temperature thereof is over 1250° C. during a normal operation of a furnace, are made of aluminum-titanate as a main crystal phase or a combination of aluminum-titanate and mullite, and (b) honeycomb structural bodies arranged in a low temperature portion are made of cordierite and/or mullite as a main crystal phase.

According to a second embodiment of the invention, a honeycomb regenerator for recovering a waste heat in an exhaust gas by alternately passing an exhaust gas and a gas to be heated therethrough, constructed by stacking a plurality of honeycomb structural bodies, comprising (a) honeycomb structural bodies arranged in a high temperature portion, to which said exhaust gas having a high temperature is contacted, are made of aluminum-titanate as a main crystal phase or a combination of aluminum-titanate and mullite, (b) said honeycomb structural bodies arranged in a middle temperature portion, in which a temperature is at least over 1200° C., are made of alumina as a main crystal phase, and (c) honeycomb structural bodies arranged in a low temperature portion, in which a temperature is lower than that of said alumina honeycomb structural bodies, are made of one material or a combination of materials selected from a group of cordierite, mullite and a porcelain having a corrosion resistivity.

DESCRIPTION OF THE PREFERRED EMBODIMENT

Figure 1:
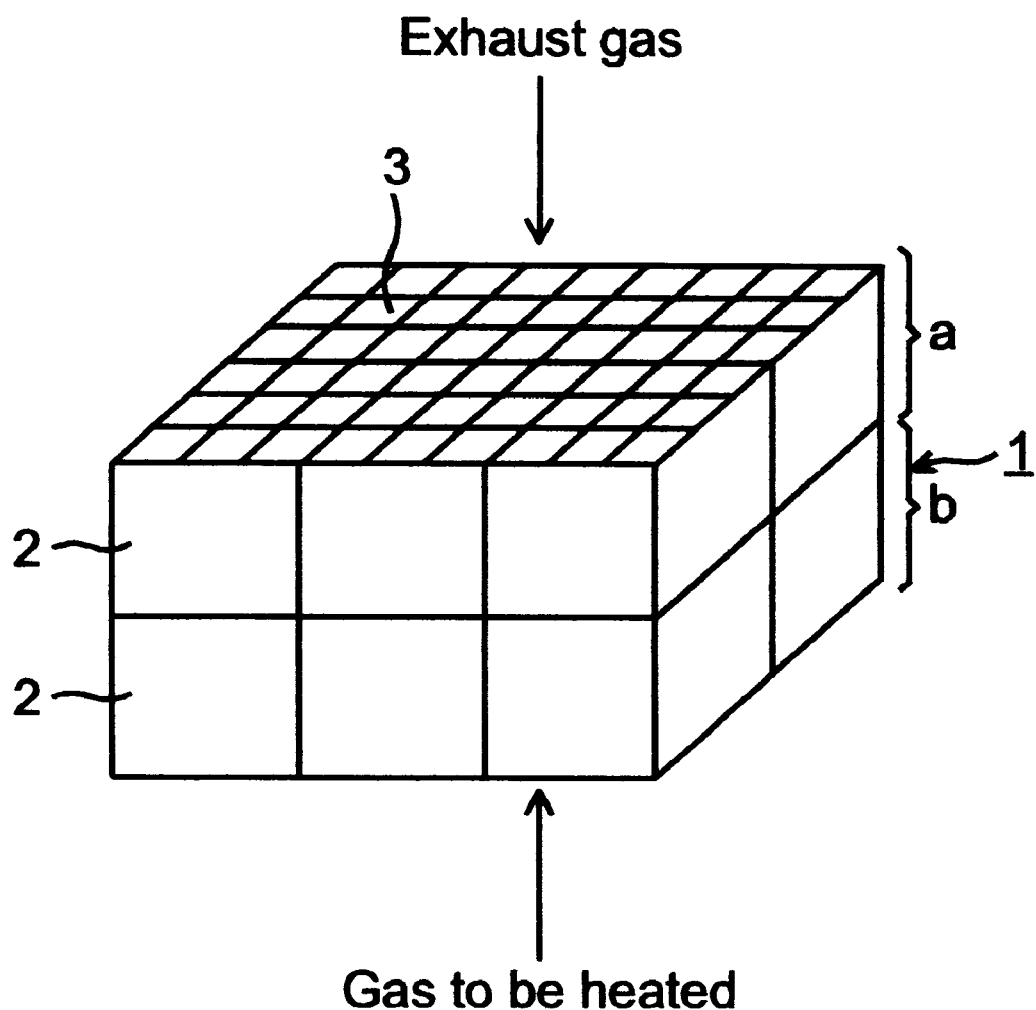
FIG. 1 is a schematic view showing one embodiment of a honeycomb regenerator according to a first embodiment of the invention.

FIG. 1 is a schematic view showing one embodiment of a honeycomb regenerator according to the invention. In the embodiment shown in FIG. 1, a honeycomb regenerator 1 is formed by stacking a plurality of honeycomb structural bodies 2 having a rectangular shape in such a manner that flow passages thereof constructed by through-holes 3 are aligned in one direction. In FIG. 1, an upper surface of the honeycomb regenerator 1 is brought into contact with an exhaust gas having a high temperature. In this embodiments, a high temperature portion (a) in which a temperature during a normal operation of a combustion heating furnace becomes over 1250° C. is constructed by honeycomb structural bodies 2 made of aluminum-titanate as a main crystal phase, and a low temperature portion (b) is constructed by honeycomb structural bodies 2 made of cordierite as a main crystal phase.

A position of a boundary between the high temperature portion (a) and the low temperature portion (b) is determined as follows. At first, a dummy honeycomb regenerator is used in the normal operation of the combustion heating furnace and temperatures at plural positions of the dummy honeycomb regenerator are measured. Then, a portion in which a temperature is always over 1250° C. regardless of a heat storing time and a heat discharging time is defined as the high temperature portion (a). Moreover, a portion in which a temperature is at least once under 1250° C. during the heat storing time and the heat discharging time is defined as the low temperature portion (b). In the embodiment shown in FIG. 1, all the honeycomb structural bodies 2 have the same shape, but it is possible to construct the honeycomb regenerator 1 in such a manner that a size or dimension of the honeycomb structural bodies 2 positioned at an outer peripheral or perimeter portion is made smaller than that of the honeycomb structural bodies 2 positioned at a center portion residing within the perimeter portion, on a plane to which an exhaust gas having a high temperature is contacted.

In the embodiment mentioned above, aluminum-titanate becomes stable in a high temperature and is not decomposed over 1250° C. In this embodiment, since the portion which is always over 1250° C. is constructed by the honeycomb structural bodies made of aluminum-titanate as a main crystal phase, it is possible to obtain the honeycomb regenerator which can perform a heat exchanging operation effectively without being fractured even in a exhaust gas having a high temperature over 1400° C. Moreover, as a material of aluminum-titanate, use is made of aluminum-titanate in which MgO and $Fe_2O_3$ are included as a solid solution as shown in Japanese Patent Publication No. 60-5545 or Japanese Patent Publication No. 59-19068. This is because aluminum-titanate including MgO and $Fe_2O_3$ has an excellent heat stability.

On the other hand, aluminum-titanate is decomposed into alumina and titania at near 1100° C., so that a thermal expansion coefficient becomes larger and a dimension is varied. Therefore, it is not possible to use aluminum-titanate for a long time in a temperature range of 1100~1200° C. For the reason mentioned above, if the portion which becomes under 1250° C. is constructed by the honeycomb structural bodies made of aluminum-titanate as a main crystal phase, the honeycomb structural bodies made of aluminum-titanate as a main body are liable to be fractured due to a high thermal expansion coefficient and thus it is not preferable. Further, aluminum-titanate is expensive. Therefore, in this embodiment, a low temperature portion to which the use of aluminum-titanate is not preferred is constructed by the honeycomb structural bodies made of cordierite and/or mullite as a main crystal phase.

In the case that a size or dimension of the honeycomb structural bodies positioned at an outer peripheral or perimeter portion is made smaller than the area of the honeycomb structural bodies positioned at a center portion residing within the perimeter, on a plane to which an exhaust gas having a high temperature is contacted, a thermal shock resistivity of the honeycomb structural bodies positioned at an outer peripheral portion is improved. Moreover, it is possible to eliminate the drawbacks such that a temperature inclination is generated if all the honeycomb structural bodies have the same dimension on the same plane and the honeycomb structural bodies are fractured due to the temperature inclination. Therefore, it is possible to obtain the honeycomb regenerator which can perform a heat exchanging operation effectively without being fractured even in an exhaust gas having a high temperature, and thus it is preferred.

Figure 2:
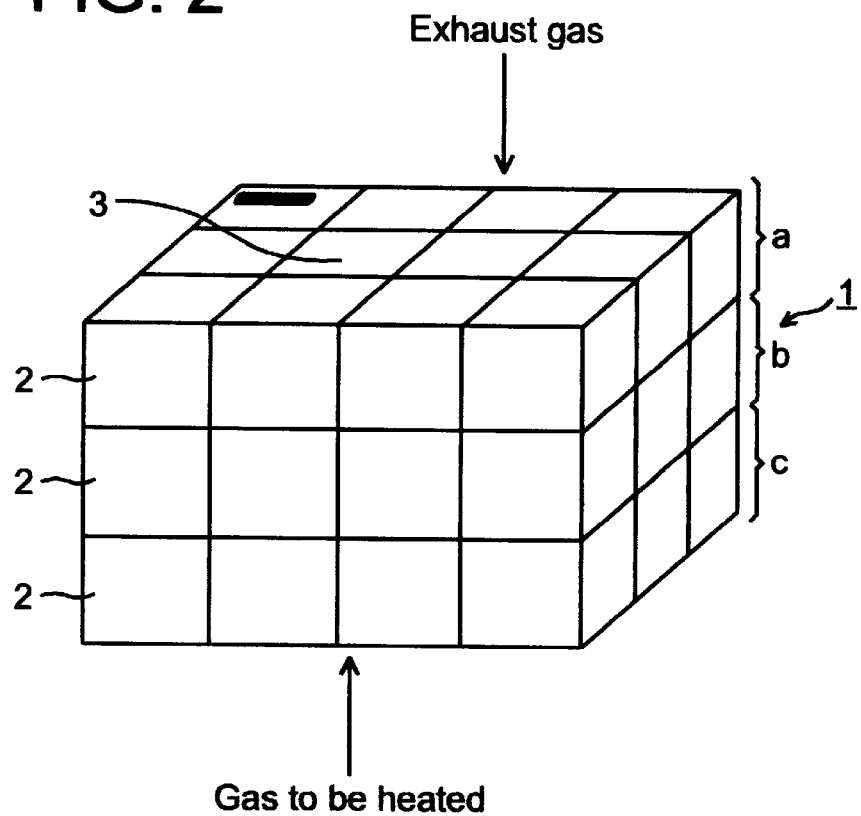
FIG. 2 is a schematic view illustrating one embodiment of a honeycomb regenerator according to a second embodiment of the invention.

FIG. 2 is a schematic view showing one embodiment of a honeycomb regenerator according to a second aspect of the invention. In the embodiment shown in FIG. 2, a honeycomb regenerator is also formed by stacking a plurality of honeycomb structural bodies 2 having a rectangular shape in such a manner that flow passages thereof constructed by through-holes 3 are aligned in one direction. In FIG. 2, an upper surface of the honeycomb regenerator 1 is brought into contact with an exhaust gas having a high temperature. In this embodiment, a high temperature portion (a) to which an exhaust gas having a high temperature is directly contacted during a normal operation of a combustion heating furnace is constructed by honeycomb structural bodies 2 made of aluminum-titanate as a main crystal phase or by honeycomb structural bodies 2 made of a combination of aluminum-titanate and mullite as a main crystal phase. A middle temperature portion (b) in which a temperature becomes at least over 1200° C. is constructed by honeycomb structural bodies 2 made of alumina as a main crystal phase.

A low temperature portion (c) arranged in a low temperature side as compared with the alumina honeycomb structural bodies is constructed by honeycomb structural bodies 2 made of cordierite or mullite as a main crystal phase or by a combination of honeycomb structural bodies 2 selected from a group of cordierite, mullite and an anti-corrosive porcelain.

Moreover, in the embodiment shown in FIG. 2, all the honeycomb structural bodies 2 have the same shape, but it is possible to construct the honeycomb regenerator 1 in such a manner that a dimension size or of the honeycomb structural bodies 2 positioned at an outer peripheral or perimeter portion is made smaller than the size of the honeycomb structural bodies 2 positioned at a center portion, on a plane to which an exhaust gas having a high temperature is directly contacted.

As a material consisting of the honeycomb regenerator 1 shown in FIG. 2, aluminum-titanate is known as a heat resistive and low thermal expansion material. Moreover, since aluminum-titanate is stable with respect to an iron component even in a high temperature near 1300° C. and has an excellent thermal shock resistivity, it is not fractured even by an abrupt temperature change. Further, aluminum-titanate is decomposed into alumina and titania at near 1100° C., and then a thermal expansion coefficient thereof becomes larger. Therefore, if the portion which becomes under 1250° C. for a long time is constructed by the honeycomb structural bodies made of aluminum-titanate as a main crystal phase, it is preferred to use aluminum-titanate in which MgO and $Fe_2O_3$ are included as a solid solution so as to suppress the thermal decomposition.

If MgO is included -in aluminum-titanate as a solid solution, it is possible to suppress the thermal decomposition at near 1100° C. to some extent. However, it is not sufficient to suppress the thermal decomposition effectively, and thus it is preferred that aluminum-titanate includes $Fe_2O_3$ as well as MgO. Moreover, in the present invention, it is found that MgO solid solution functions not only to suppress the thermal decomposition but also to improve anti-corrosion properties especially anti-alkali properties.

In this case, an amount of MgO to be added is preferred to be 4~10 wt %, and an amount of $Fe_2O_3$ to be added is preferred to be 2~10 wt %. The reason for preferably limiting an amount of MgO to 4~10 wt % is as follows. If an amount of MgO is not larger than 4 wt %, sufficient anti-alkali properties are not obtained. If an amount of MgO is not smaller than 10 wt %, MgO is not completely included in aluminum-titanate as a solid state, and thus spinel or magnesium-titanate having a high thermal expansion coefficient is generated, so that a thermal expansion coefficient of the honeycomb structural body becomes larger. Moreover, if $Fe_2O_3$ is included in aluminum-titanate as a solid solution, re ion is completely substituted with Al ion, and thus the thermal decomposition of aluminum-titanate is suppressed. The reason for preferably limiting an amount of $Fe_2O_3$ to 2~10 wt % is as follows. If an amount of $Fe_2O_3$ is not larger than 2 wt %, the thermal decomposition cannot be suppressed completely. If an amount of $Fe_2O_3$ is not smaller than 10 wt %, a thermal expansion coefficient becomes larger.

In this embodiment, the reason for using the honeycomb structural bodies made of alumina as a main crystal phase to a lower temperature portion than the honeycomb structural bodies made of aluminum-titanate as a main crystal phase is as follows. At first, aluminum-titanate is an expensive material, and thus the use of aluminum-titanate is limited to an important portion. In this embodiment, it is sufficient to use aluminum-titanate only to a portion to which an exhaust gas having a high temperature is directly contacted, since the honeycomb structural bodies made of alumina as a main crystal phase having a high thermal expansion coefficient can be used to a portion to which the exhaust gas having a high temperature is not directly contacted and thus a thermal shock is weakened. Moreover, since the portion in which a temperature becomes at least over 1200° C. during a normal operation of the combustion heating furnace has a problem on a corrosion due to an iron component occasionally an alkali component, it is necessary to use the honeycomb structural bodies made of alumina as a main crystal phase having an excellent corrosion resistivity.

Moreover, it is necessary to use one of the cordierite honeycomb structural body, the mullite honeycomb structural body and the porcelain honeycomb structural body or the combination thereof for the low temperature portion of the honeycomb regenerator. If a temperature of the honeycomb structural body is always under 1200° C., the corrosion due to the iron and alkali proceeds gradually, and thus it is possible to use the cordierite honeycomb structural body which has a low thermal expansion coefficient and an excellent thermal shock resistivity. Therefore, in this case, a dimension of one honeycomb structural body can be made larger and thus a handling of the honeycomb structural body can be made easier. Moreover, if an amount of the iron or the alkali exhausted from the combustion heating furnace is large, it is preferred to use the honeycomb structural body made of mullite as a main crystal phase which has a larger thermal expansion coefficient in a high temperature but has a better heat resistivity and corrosion resistivity than the cordierite honeycomb structural body. Further, only for the low temperature portion, it is possible to use the honeycomb structural body made of cordierite as a main crystal phase.

Moreover, in the case that a heavy oil is used as a fuel, SOx is generated due to a phosphorus component in the heavy oil; and thus it is not possible to use the cordierite or mullite honeycomb structural body for the portion of the honeycomb regenerator at which a temperature is under a dew point of SOx. In this case, it is preferred to use the honeycomb structural body made of an anti-corrosive porcelain. As for the honeycomb structural body made of an anti-corrosive porcelain, use is preferably made of a feldspar porcelain and an alumina porcelain both of which have an open porosity of substantially 0 and show an excellent acid resistivity. In the present invention, it is necessary to construct the honeycomb regenerator using the honeycomb structural bodies made of various kinds of materials corresponding to a temperature to be used, an atmosphere of the exhaust gas in the combustion heating furnace to be installed and so on.

Figure 3:
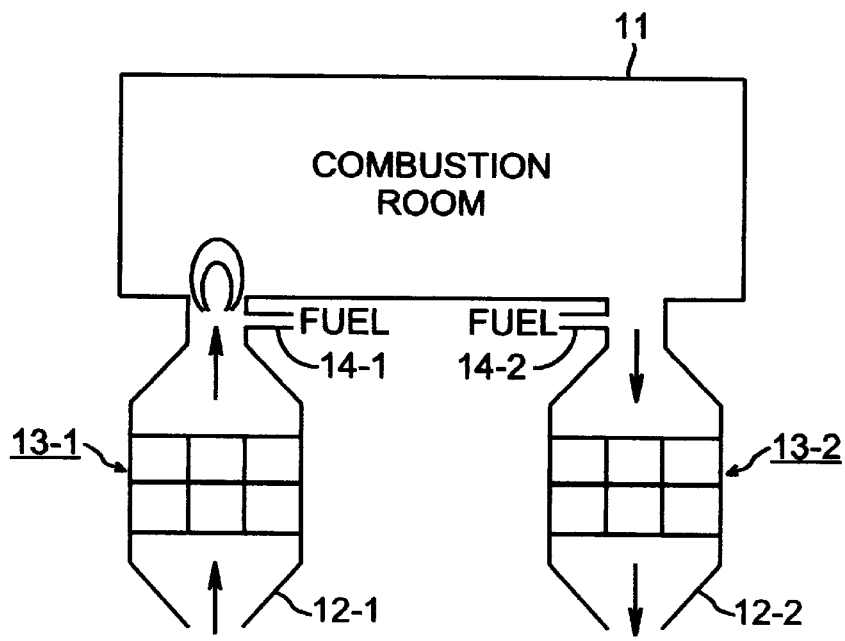
FIG. 3 is a schematic view depicting one embodiment such that a heat exchanging apparatus utilizing the honeycomb regenerator according to the invention is applied to a combustion room of a combustion heating furnace.

FIG. 3 is a schematic view showing one embodiment such that a heat exchanging apparatus utilizing the honeycomb regenerator according to the invention is applied to a combustion room of a combustion heating furnace. In the embodiment shown in FIG. 3, a numeral 11 is a combustion room, numerals 12-1 and 12-2 are a honeycomb regenerator having a construction shown in FIGS. 1 and 2, numerals 13-1 and 13-2 are a heat exchanging apparatus constructed by the honeycomb regenerator 12-1 or 12-2, and numeral 14-1 and 14-2 are a fuel supply inlet of the heat exchanging apparatus 3-1 or 13-2. In the embodiment shown in FIG. 3, two heat exchanging apparatuses 13-1 and 13-2 are arranged for performing the heat storing operation and the heating operation at the same time. That is to say, when one of them performs the heat storing operation, the other can perform the heating operation at the same time, thereby performing the heat exchanging operation effectively.

As shown by an arrow in FIG. 3, an air to be heated is supplied upwardly in the heat exchanging apparatus 13-1 in which the honeycomb regenerator 12-1 is pre-heated by storing a heat, and, at the same time, an exhaust gas having a high temperature is supplied from the combustion room 11 to the heat exchanging apparatus 13-2. Moreover, a fuel is supplied in the heat exchanging apparatus 13-1 via the fuel supply inlet 14-1 at the same time. Therefore, the pre-heated air is supplied in the combustion room 11 with a fuel, and the honeycomb regenerator 12-2 of the heat exchanging apparatus 13-2 is pre-heated.

Then, the gas flows are changed in a reverse direction with respect to the arrows in FIG. 3. After that, an air to be heated is supplied upwardly in the heat exchanging apparatus 13-2, and, at the same time, an exhaust gas having a high temperature is supplied from the combustion room 11 to the heat exchanging apparatus 13-1. In the embodiment mentioned above, the heat exchanging operation can be performed by repeating continuously the steps mentioned above.

Hereinafter, an actual embodiment according to a first aspect of the present invention will be explained.

EMBODIMENT 1

A honeycomb structural body made of aluminum-titanate according to the invention, a honeycomb is structural body made of aluminum-titanate and mullite according to the invention, and honeycomb structural bodies made of cordierite, alumina, mullite or Si impregnated Sic according to the comparative example were prepared. With respect to the thus prepared honeycomb structural bodies, melting points, thermal expansion coefficients between 40° C. and 800° C., spalling fracture temperatures in an electric furnace and corrosion resistivities were measured and estimated. In this case, three aluminum-titanate honeycomb structural bodies were different on kinds of impurities and an amount of aluminum-titanate crystal.

The honeycomb structural bodies according to the invention were produced as follows. At first, alumina powders having a mean particle size of 1~10 μm, titania powders having a mean particle size of 0.1~5 μm, and mullite powders if necessary were mixed to obtain mixed raw material powders. Then, organic binders, surface activators and water were added to the mixed raw material powders to obtain a formable batch. Then, the thus obtained batch was extruded to obtain a honeycomb structural formed body. The thus obtained honeycomb structural formed body was fired in a temperature of 1400~1700° C. to obtain a honeycomb structural body. Moreover, the honeycomb structural bodies according to the comparative example were produced according to the known producing method. All the honeycomb structural bodies had a dimension of 75 mm×75 mm×50 mm.

The spalling fracture temperature in an electric furnace was measured as follows. At first, the honeycomb structural body was maintained in respective temperatures for one hour and then cooled down. After that, a crack generation was observed. As a result, the spalling fracture temperature in an electric furnace was defined as a highest temperature at which no crack was generated. Moreover, the corrosion resistivity was estimated as a relative value. The results were shown in the following Table 1.

TABLE 1

| | Materials of honeycomb structural body | Melting point (° C.) | Thermal expansion coefficient (×10⁻⁶/ 40–800° C.) | Spalling fracture temperature (° C.) | Corrosion resistivity |
|---|---|---|---|---|---|
| Comparative Example | Cordierite | 1450 | 0.6 | >1000 | X |
| | Alumina | 2050 | 7.8 | 450 | ⊚ |
| | Mullite | 1850 | 5.0 | 500 | Δ |
| | Si impregnated SiC | 1400 | 4.0 | 950 | O |
| Present invention | Alumina-titanate 1 | 1800 | 1.5 | 950 | Δ |
| | Alumina-titanate 2 | 1800 | 1.0 | >1000 | Δ |
| | Alumina-titanate 3 | 1800 | −0.4 | 950 | Δ |
| | Alumina-titanate 3 + Mullite | 1810 | 1.2 | 900 | Δ |

From the results shown in Table 1, it was understood that the honeycomb structural bodies made of three kinds of aluminum-titanate had a high melting point of 1800° C., a low thermal expansion coefficient and thus an excellent spalling fracture temperature in an electric furnace such as the same or higher than that of the other honeycomb structural bodies. Moreover, it was understood that the aluminum-titanate honeycomb structural bodies were preferably used as the honeycomb regenerator under a high temperature and a corrosive condition.

EMBODIMENT 2

With respect to the honeycomb regenerators according to the present invention and the comparative example, an actual using condition of the honeycomb regenerators was observed. At first, the honeycomb regenerators according to the present invention and the comparative example having a construction shown in FIG. 4 were prepared by stacking the honeycomb structural bodies in such a manner that flow passages were aligned in one direction and materials of a high temperature portion (a) and a low temperature portion (b) were selected as shown in the following Table 2. All the honeycomb structural bodies had the same dimension of 75 mm×75 mm×50 mm. Moreover, the sample No. 7 according to the invention had a chemical composition of 97 wt % of aluminum-titanate and 3 wt % of mullite.

Figure 4:
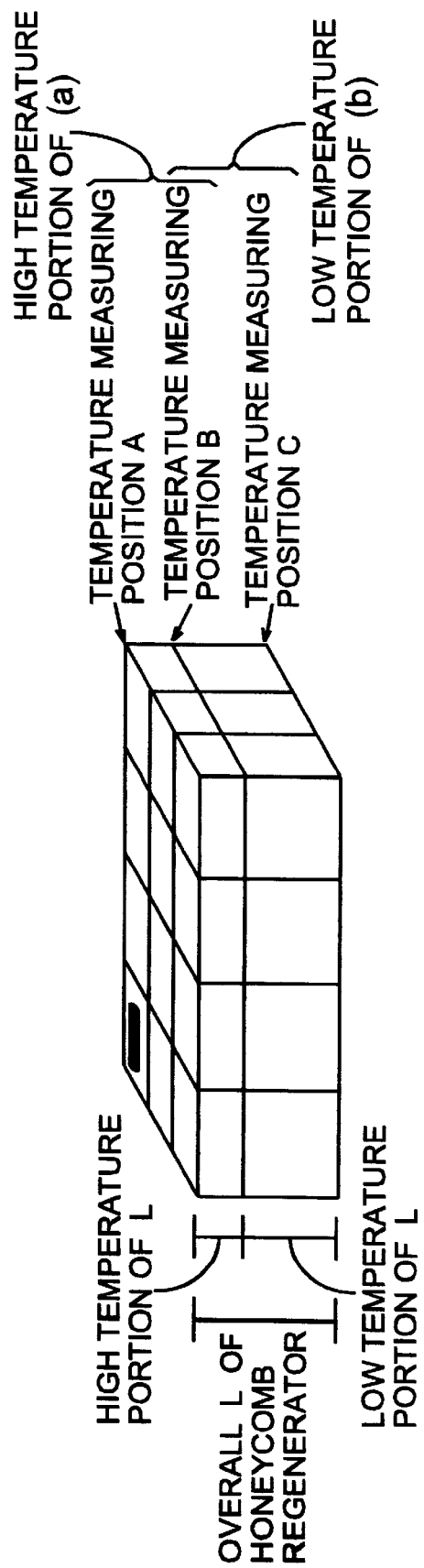
FIG. 4 is a schematic view showing a construction of the honeycomb regenerator according to the first embodiment of the invention which is used in an experiment.
Figure 5:
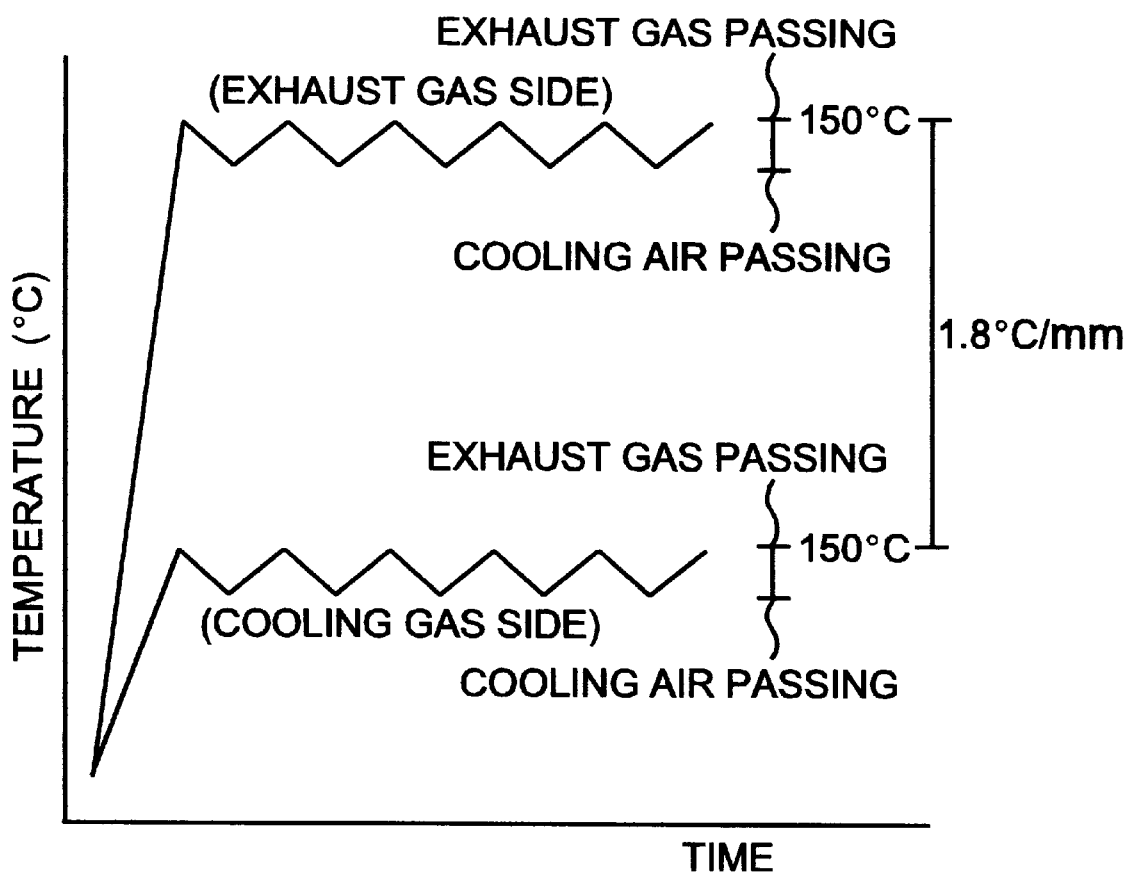
FIG. 5 is a graph illustrating a heat curve during an operation of the honeycomb regenerator according to the first embodiment of the invention which is used in the experiment.

With respect to the thus prepared honeycomb regenerators according to the present invention and the comparative example, a heat storing operation and a heat discharging operation were performed repeatedly according to a heat curve shown in FIG. 5. In this case, a temperature difference of the honeycomb regenerator between a state of passing an exhaust gas having a high temperature and a state of passing a cooling air is 150° C. Moreover, a temperature inclination in the honeycomb regenerator along a length L direction was 1.8° C./mm, As shown in FIG. 4, temperatures during an operation was measured at three points in the honeycomb structural body, i.e. at an upper portion A to which an exhaust gas is contacted, a middle portion B, and a lower portion C to which a cooling air is contacted. Moreover, an overall length L of the honeycomb regenerator was varied in such a manner that a temperature of the lower portion C was always under 300° C. This was because apparatuses such as pipes, valves and so on we re protected. It should be noted that the dimension (length) L in Table 2 is one example and thus it is not limited to the value shown in Table 2. The measuring results were shown in the following Table 2.

TABLE 2

Structure of honeycomb regenerator

| | | Honeycomb high temperature portion (a) | | | | Honeycomb low temperature portion (b) | | | |
|---|---|---|---|---|---|---|---|---|---|
| Sample No. | Materials | Dimension L (mm) | Temperature of upper portion A | Temperature of lower portion B | Materials | Dimension L (mm) | Temperature of lower portion C | Overall dimension L (mm) | Condition |
| Comparative Example 1 | cordierite | 150 | 1500(° C.) (1350° C.) | 1230° C. (1080° C.) | cordierite | 550 | 204(° C.) (90° C.) | 700 | honeycomb melt down at high temperature portion X |
| 2 | cordierite | 150 | 1450(° C.) (1300° C.) | 1180(° C.) (1030° C.) | cordierite | 500 | 280(° C.) (130° C.) | 650 | honeycomb partly softening at high temperature portion Δ |
| 3 | aluminum-titanate | 150 | 1500(° C.) (1350° C.) | 1230° C. (1080° C.) | aluminum-titanate | 550 | 240(° C.) (90° C.) | 700 | honeycomb fracture at low temperature portion X |
| Present invention 4 | aluminum-titanate | 50 | 1500(° C.) (1350° C.) | 1410(° C.) (1260° C.) | cordierite | 650 | 240(° C.) (90° C.) | 700 | honeycomb normal at high and low temperature portions ○ |
| 5 | aluminum-titanate | 100 | 1600(° C.) (1450° C.) | 1430(° C.) (1270° C.) | cordierite | 650 | 260(° C.) (110° C.) | 750 | honeycomb normal at high and low temperature portions ○ |
| 6 | aluminum-titanate | 150 | 1700(° C.) (1550° C.) | 1430(° C.) (1280° C.) | cordierite | 650 | 260(° C.) (110° C.) | 800 | honeycomb normal at high and low temperature portions ○ |
| 7 | aluminum-titanate and mullite | 50 | 1490(° C.) (1340° C.) | 1400(° C.) (1250° C.) | cordierite | 650 | 230(° C.) (80° C.) | 700 | honeycomb normal at high and low temperature portions ○ |
| 8 | aluminum-titanate | 50 | 1500(° C.) (1350° C.) | 1410(° C.) (1250° C.) | mullite | 650 | 240(° C.) (90° C.) | 700 | honeycomb normal at high and low temperature portions ○ |

From the results shown in Table 2, the followings were understood. At first, since the cordierite honeycomb structural bodies were used for a high temperature portion (a) and a low temperature portion (b) in the sample Nos. 1 and 2 according to the comparative example, the honeycomb structural bodies at the high temperature portion (a) were melt down or softening, if they were used over 1450° C., so that the honeycomb regenerators of the sample Nos. 1 and 2 were not preferred. Moreover, in the sample No. 3 according to the comparative example in which aluminum-titanate honeycomb structural bodies were used for the high temperature portion (a) and the low temperature portion (b), a temperature at the middle portion B was 1080° C. when a cooling air was passed and 1230° C. even when an exhaust gas having a high temperature was passed. In this case, aluminum-titanate was a material having a high melting point and a low thermal expansion coefficient, but became a material having a high thermal expansion coefficient since it was decomposed into alumina and titania at near 1100° C. In the sample No. 3 according to the comparative example, a temperature at the middle portion B was not increased over 1250° C., the aluminum-titanate honeycomb structural bodies at the low temperature portion (b) were fractured.

Figure 6:
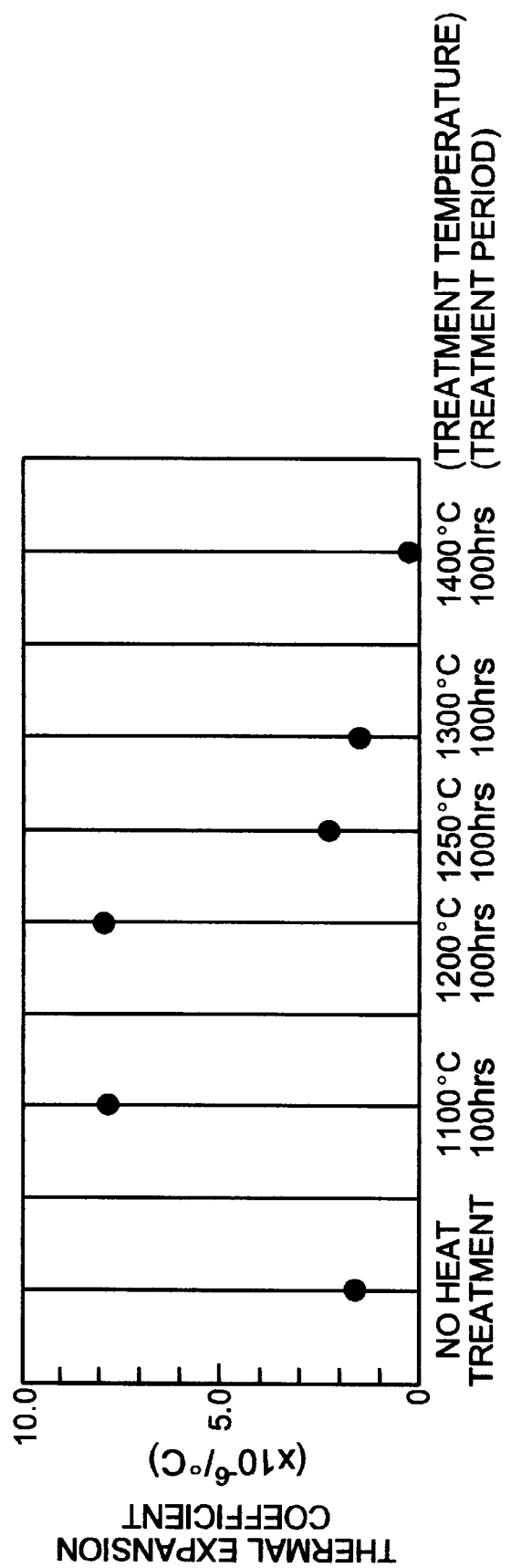
FIG. 6 is a graph depicting a variation of thermal expansion coefficients of aluminum-titanate honeycomb structural body after various heat treatments.

FIG. 6 was a graph showing a variation of thermal expansion coefficients of aluminum-titanate honeycomb structural body after various heat treatments. In FIG. 6, a thermal expansion coefficient was abruptly increased in a temperature range of 1100° C.~1250° C., and thus it was understood that a thermal shock resistivity was worse in this temperature range. Contrary to this, a thermal expansion coefficient was not abruptly increased in a temperature range of over 1250° C., and thus it was understood that the aluminum-titanate honeycomb structural bodies were used preferably in this temperature range.

On the other hand, in the sample Nos. 4~8 according to the present invention, the aluminum-titanate honeycomb structural bodies or the aluminum-titanate+mullite honeycomb structural bodies were used for the high temperature portion (a), and the cordierite honeycomb structural bodies or the mullite honeycomb structural bodies were used for the low temperature portion (b). Moreover, the honeycomb regenerator was constructed in such a manner that a temperature at a boundary between the aluminum-titanate honeycomb structural bodies or the aluminum-titanate+mullite honeycomb structural bodies and the cordierite honeycomb structural bodies or the mullite honeycomb structural bodies i.e. a temperature at the middle portion B was not over 1450° C. when an exhaust gas having a high temperature was passed, and that the temperature mentioned above was not under 1250° C. when a cooling air was passed. Further, a length L of the aluminum-titanate honeycomb structural body and an overall length L of the honeycomb regenerator were varied corresponding to a temperature to be used. In the sample Nos. 4~8 according to the present invention, a condition to be used of the honeycomb regenerator was always normal, i.e. both of the high temperature portion and the low temperature portion of the honeycomb regenerator were always normal. Further, if both of the cordierite honeycomb structural bodies and the mullite honeycomb structural bodies were used at the low temperature portion, the same result as those of the sample No. 4~8 according to the invention can be obtained.

Hereinafter, actual embodiments according to a second of the present invention will be explained.

EMBODIMENT 3

At first, honeycomb structural bodies made of various materials used in the present invention were prepared. With respect to the thus prepared honeycomb structural bodies, melting points, thermal expansion coefficients between 40° C. and 800° C., spalling fracture temperatures in an electric furnace, alkali resistivities and acid resistivities were measured. The spalling fracture temperature in an electric furnace was measured as follows. At first, the honeycomb structural body having a dimension of 75 mm×75 mm×50 mm was maintained in respective temperatures for one hour and then cooled down. After that, a crack generation was observed. As a result, the spalling fracture temperature in an electric furnace was defined as a highest temperature at which no rack was generated. Moreover, both of the alkali resistivity and the acid resistivity were estimated relatively and were marked as an order of ⊚>o>Δ>x from a good one. The results were shown in the following Table 3.

TABLE 3

| Materials | Melting point (° C.) | Thermal expansion coefficient (×10⁻⁶/40–800° C.) | Spalling fracture temperature (° C.) | Alkali resistivity | Acid resistivity |
|---|---|---|---|---|---|
| Cordierite | 1450 | 0.6 | >1000 | X | X |
| Alumina | 2050 | 7.8 | 450 | O | O |
| Mullite | 1850 | 5.0 | 500 | Δ | Δ |
| Aluminum titanate | 1700 | 0.5 | >1000 | ⊚ | O |
| Porcelain honey comb | >1500 | 6.0 | 450 | X | ⊚ |

(Note) * Dimension of honeycomb structural body used for measuring a spalling fracture temperature is 75 mm × 75 mm × 50 mm.

From the results shown in Table 3, the aluminum-titanate honeycomb structural bodies including $Fe_2O_3$ and MgO had a high melting point of 1700° C., a low thermal expansion coefficients and a high spalling fracture temperature in an electric furnace, and thus it was understood that the aluminum-titanate honeycomb structural body has an excellent thermal shock resistivity. Moreover, it was understood that aluminum-titanate had a better alkali resistivity and a better acid resistivity than those of the other materials. Contrary to this, the porcelain honeycomb structural bodies used in a low temperature portion of the honeycomb regenerator had a high thermal expansion coefficient and thus a thermal shock resistivity was not so good. However, it was understood that the porcelain honeycomb structural bodies had a better acid resistivity than that of the honeycomb structural bodies made of the other materials.

EMBODIMENT 4

Figure 7:
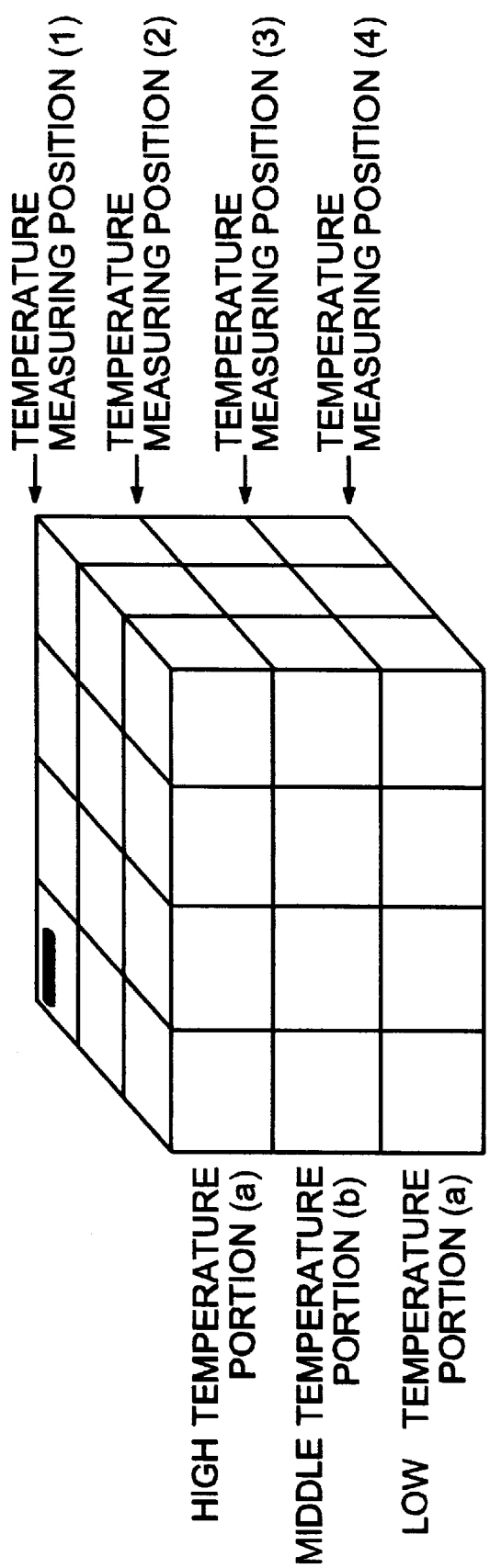
FIG. 7 is a schematic view showing a construction of the honeycomb regenerator according to the second embodiment of the invention which is used in the experiment.
Figure 8:
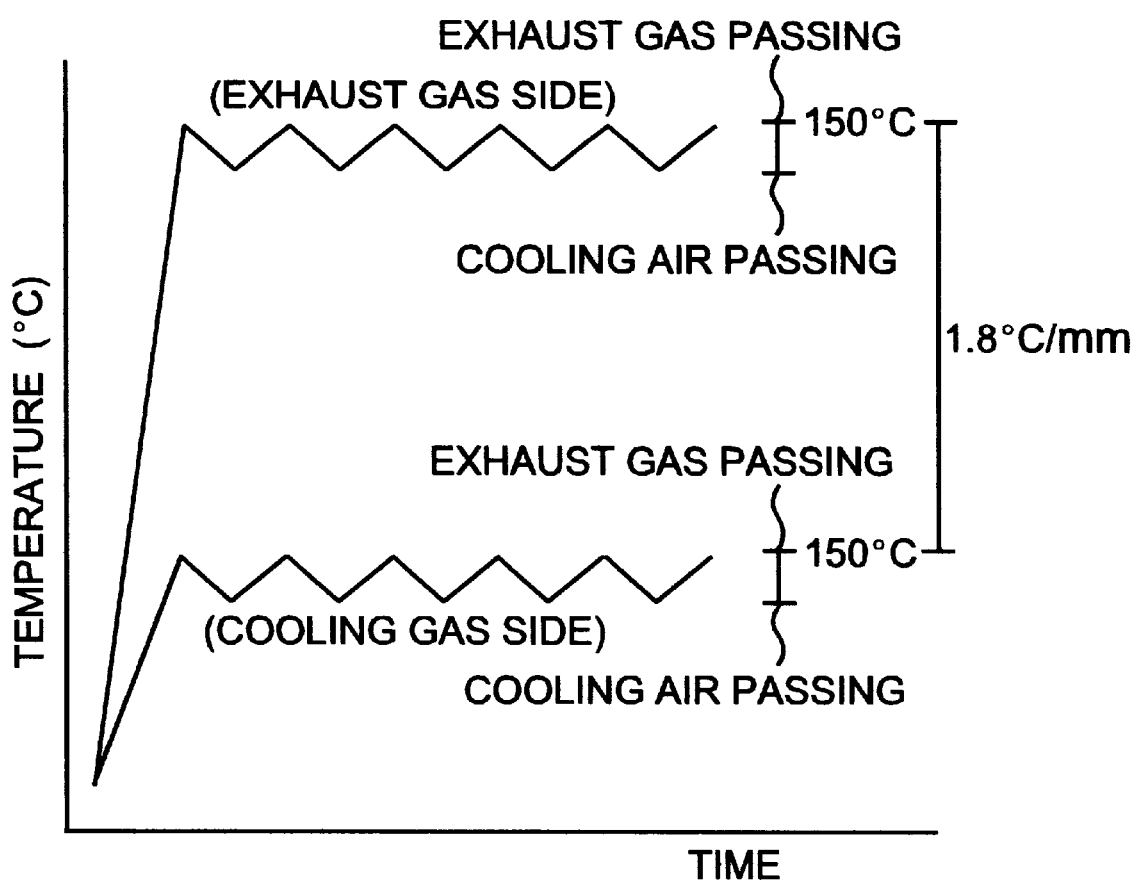
FIG. 8 is a graph illustrating a heat curve during an operation of the honeycomb regenerator according to the second embodiment of the invention which is used in the experiment.

With respect to the honeycomb regenerator having various constructions according to the present invention and the comparative example, an actual using condition of the honeycomb regenerators was observed. At first, the honeycomb regenerators according to the present invention and the comparative example having a construction shown in FIG. 7 were prepared by stacking the honeycomb structural bodies in such a manner that flow passages were aligned in one direction and materials of a high temperature portion (a), a middle temperature portion (b) and a low temperature portion (c) were selected as shown in the following Table 4. All the honeycomb structural bodies had the same dimension of 75 mm×75 mm×50 mm. Moreover, an atmosphere in a furnace used in this embodiment was a hard condition in which an alkali component and an iron component were suspended. As for a fuel for a burner to be used in the furnace, use was made of a natural gas and a heavy oil. In the case that the heavy oil was used, it was confirmed that a sulfuric acid was generated under a dew point of acid in the furnace, With respect to the thus prepared honeycomb regenerators according to the present invention and the comparative example, a heat storing operation and a heat discharging operation were performed repeatedly according to a heat curve shown in FIG. 8. In this case, a temperature difference of the honeycomb regenerator between a state of passing an exhaust gas having a high temperature and a state of passing a cooling air is about 150° C. The following Table 4 showed a construction of respective honeycomb regenerators and an actual using condition. In the results shown in Table 4, temperatures of the honeycomb regenerator were measured at temperature measuring positions (1)–(4) shown in FIG. 7 when the honeycomb regenerator had a highest temperature i.e. when an exhaust gas having a high temperature was passed. Moreover, an overall length L of the honeycomb regenerator was varied in such a manner that a temperature of the temperature measuring position (4) was always under 300° C. This was because apparatuses such as pipes, values and so on were protected. Moreover, in Table 4, a temperature is measured when an exhaust gas having a high temperature is passed through the honeycomb regenerator.

TABLE 4

| | | Structure of honeycomb regenerator | | | | | | | |
|---|---|---|---|---|---|---|---|---|---|
| | | Honeycomb high temperature portion (a) | | | Honeycomb middle temperature portion (b) | | Honeycomb low temperature portion (c) | | | |
| Sample No. | | Materials | Temperature of portion (1) (° C.) | Temperature of portion (2) (° C.) | Materials | Temperature of portion (3) (° C.) | Materials | Temperature of portion (4) (° C.) | Fuel | Condition | |
| Comparative Example | 1 | cordierite | 1400 | 1300 | cordierite | 1200 | cordierite | 240 | natural gas | melt down at high temperature honeycomb, partly softening at middle temperature honeycomb | X |
| | 2 | alumina | 1400 | 1300 | cordierite | 1200 | cordierite | 240 | natural gas | melt down at high temperature honeycomb, partly softening at middle temperature honeycomb | X |

TABLE 4-continued

| | Structure of honeycomb regenerator | | | | | | | | | |
|---|---|---|---|---|---|---|---|---|---|---|
| | | Honeycomb high temperature portion (a) | | Honeycomb middle temperature portion (b) | | Honeycomb low temperature portion (c) | | | | |
| Sample No. | Materials | Temperature of portion (1) (° C.) | Temperature of portion (2) (° C.) | Materials | Temperature of portion (3) (° C.) | Materials | Temperature of portion (4) (° C.) | Fuel | Condition | |
| | 3 | mullite | 1400 | 1300 | alumina | 1200 | cordierite | 240 | natural gas | melt down at high temperature honeycomb | X |
| | 4 | aluminum-titanate | 1500 | 1400 | alumina | 1300 | cordierite | 240 | natural gas | partly softening at low temperature honeycomb | X |
| | 5 | aluminum-titanate | 1400 | 1300 | alumina | 1200 | cordierite | 240 | heavy oil | corrosion at low temperature honeycomb | X |
| Present Invention | 6 | aluminum-titanate | 1400 | 1300 | alumina | 1200 | cordierite | 240 | natural gas | honeycomb normal at high, middle and low temperature portions | ○ |
| | 7 | aluminum-titanate + mullite | 1400 | 1300 | alumina | 1200 | mullite | 240 | natural gas | honeycomb normal at high, middle and low temperature portions | ○ |
| | 8 | aluminum-titanate | 1400 | 1300 | alumina | 1200 | cordierite + mullite | 240 | natural gas | honeycomb normal at high, middle and low temperature portions | ○ |
| | 9 | aluminum-titanate | 1400 | 1300 | alumina | 1200 | cordierite + porcelain honeycomb | 240 | heavy oil | honeycomb normal at high, middle and low temperature portions | ○ |
| | 10 | aluminum-titanate including MgO, Fe$_2$O$_3$ | 1400 | 1300 | alumina | 1200 | cordierite | 240 | natural gas | honeycomb normal at high, middle and low temperature portions | ○ |

From the results shown in table 4, the followings were understood. At first, since the cordierite honeycomb structural bodies were used for all the high temperature portion (a), the middle temperature portion (b) and the low temperature portion (c) in the sample No. 1 according to the comparative example, the honeycomb structural bodies at the high temperature portion (a) at which a temperature was over a melting point of cordierite were melt down, and also the honeycomb structural bodies at the middle temperature portion (b) at which a temperature was over 1200° C. were fractured or softening due to an abrupt corrosion proceeding by the alkali component and an iron component. Accordingly, it was understood that the honeycomb regenerator consisting of the cordierite honeycomb structural bodies only was not preferred. Moreover, in the sample No. 2 according to the comparative example in which the alumina honeycomb structural bodies were used for preventing a melt down of the high temperature portion (a), since the alumina honeycomb structural body had a high thermal expansion coefficient and thus a thermal shock resistivity thereof was worse, the alumina honeycomb structural bodies were fractured. Moreover, the honeycomb structural bodies at the middle portion (b) were fractured due to a corrosion as is the same as the sample No. 1 according to the comparative example, and were not used.

Further, in the sample No. 3 according to the comparative example in which the mullite honeycomb structural bodies having a thermal expansion coefficient smaller than that of alumina were used for the high temperature portion (a) and the alumina honeycomb structural bodies were used for the middle temperature portion (b), the alumina honeycomb structural bodies at the middle temperature portion (b) were not fractured due to a corrosion, and also were not fractured due to a thermal shock since the thermal shock applied to the middle temperature portion (b) was weak as compared with that of the high temperature portion (a). However, the mullite honeycomb structural bodies at the high temperature portion (a) were fractured due to a thermal shock. Therefore, in the sample Nos. 6~10 according to the present invention, the honeycomb structural bodies made of aluminum-titanate only, aluminum-titanate in which 5 wt % of MgO and 5 wt % of Fe$_2$O$_3$ were added or aluminum-titanate in which mullite was added were used for the high temperature portion (a) at which a corrosion due to an alkali component and an iron component and a thermal shock applied thereto were large, the alumina structural bodies were at least used for the middle temperature portion (b) at which a temperature is over 1200° C. when the honeycomb regenerator became a highest temperature, and the honeycomb structural bodies made of cordierite, mullite, cordierite in which mullite was added or a combination of cordierite honeycomb and porcelain honeycomb were used for the low temperature portion (c).

As a result, the aluminum-titanate according to the invention had an excellent corrosion resistivity due to the alkali component and the iron component and had a low thermal expansion coefficient, so that a thermal shock resistivity was large. Therefore, it was understood that the aluminum-titanate honeycomb structural bodies were used preferably for the high temperature portion (a) at which a corrosion was hard. Moreover, in the constructions mentioned above according to the invention, the alumina honeycomb structural bodies at the middle temperature portion (b) and the honeycomb structural bodies made of various materials at the low temperature portion (c) were preferably used with no problem. Therefore, it was understood that the honeycomb regenerators according to the present invention were not fractured and a heat exchanging operation could be performed effectively. However, in the sample No. 4 according to the comparative example, since the alumina honeycomb structural bodies at the middle temperature portion (b) were used over 1200° C. at the temperature measuring position (3), the honeycomb structural bodies at the high temperature portion (a) and the middle temperature portion (b) were normal, but the cordierite honeycomb structural bodies at the low temperature portion were melt down. Moreover, in the sample Nos. 6, 7, 8 and 9 according to the present invention, the alumina honeycomb structural bodies at the middle temperature portion might be used for the low temperature portion (e) i.e. a portion under the temperature measuring position (3).

In the samples mentioned above, a natural gas was used as a fuel of the burner used in the furnace, and thus a corrosion due to a sulfuric acid at the low temperature portion when cooling was not generated. However, in the sample No. 5 according to the comparative example, since use was made of a heavy oil for a fuel of the burner, a sulfuric acid was generated due to a dew of SOx at the low temperature portion (c) when cooling, and thus the cordierite honeycomb structural bodies at the low temperature portion (c) were corroded due to the thus generated sulfuric acid. In the sample No. 10 according to the present invention, since the porcelain honeycomb structural bodies were used for a portion in which the acid resistivity was necessary, the honeycomb regenerator was not fractured or melt down even at the low temperature portion (c).

EMBODIMENT 5

Figure 9:
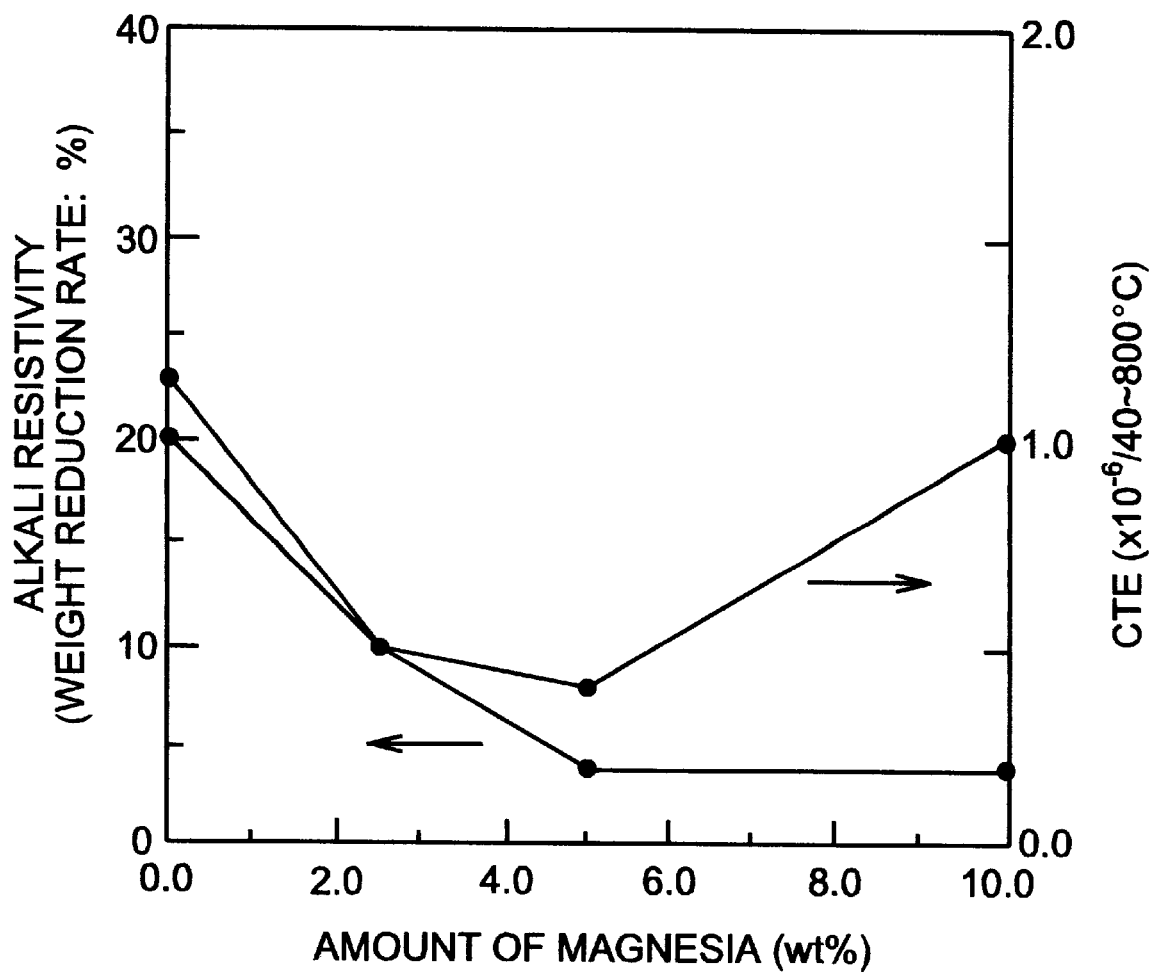
FIG. 9 is a graph depicting variations of thermal expansion coefficient and anti-alkali property of the aluminum-titanate honeycomb structural body by adding MgO.

Effects of additions of MgO and $Fe_2O_3$ with respect to an aluminum-titanate honeycomb structural body were investigated. At first, FIG. 9 showed a variation of properties due to an addition of MgO with respect to aluminum-titanate according to the invention. In FIG. 9, CTE showed a thermal expansion coefficient between 40° C. and 800° C. along a flow direction of the fired honeycomb structural body, Moreover, a weight reduction rate as an indication of an alkali resistivity was measured from a weight loss when the honeycomb structural body was immersed in 10 wt % of NaOH solution at 150° C. for twenty hours. If the weight reducing rate was small, it was understood that an excellent alkali resistivity was obtained. Moreover, in all cases, an amount of $Fe_2O_3$ was 5 wt %.

From the results shown in FIG. 9, it was understood that, if an amount of MgO to be added was varied, a thermal expansion coefficient and a corrosion resistivity of the aluminum-titanate honeycomb structural bodies were varied correspondingly. That is to say, if an amount of MgO to be added was larger, a thermal expansion coefficient was decreased temporarily to a certain level, and then increased gradually from the certain level corresponding to an increase of MgO. Moreover, the weight reduction rate indicating the alkali resistivity was decreased corresponding to an increase of Mgo addition to a certain level, and after that the weight reduction rate was not decreased. From the results shown in FIG. 9, it was understood that both of a thermal expansion coefficient and an alkali resistivity necessary for the honeycomb regenerator were satisfied sufficiently in an MgO range of 4~10 wt %.

Figure 10:
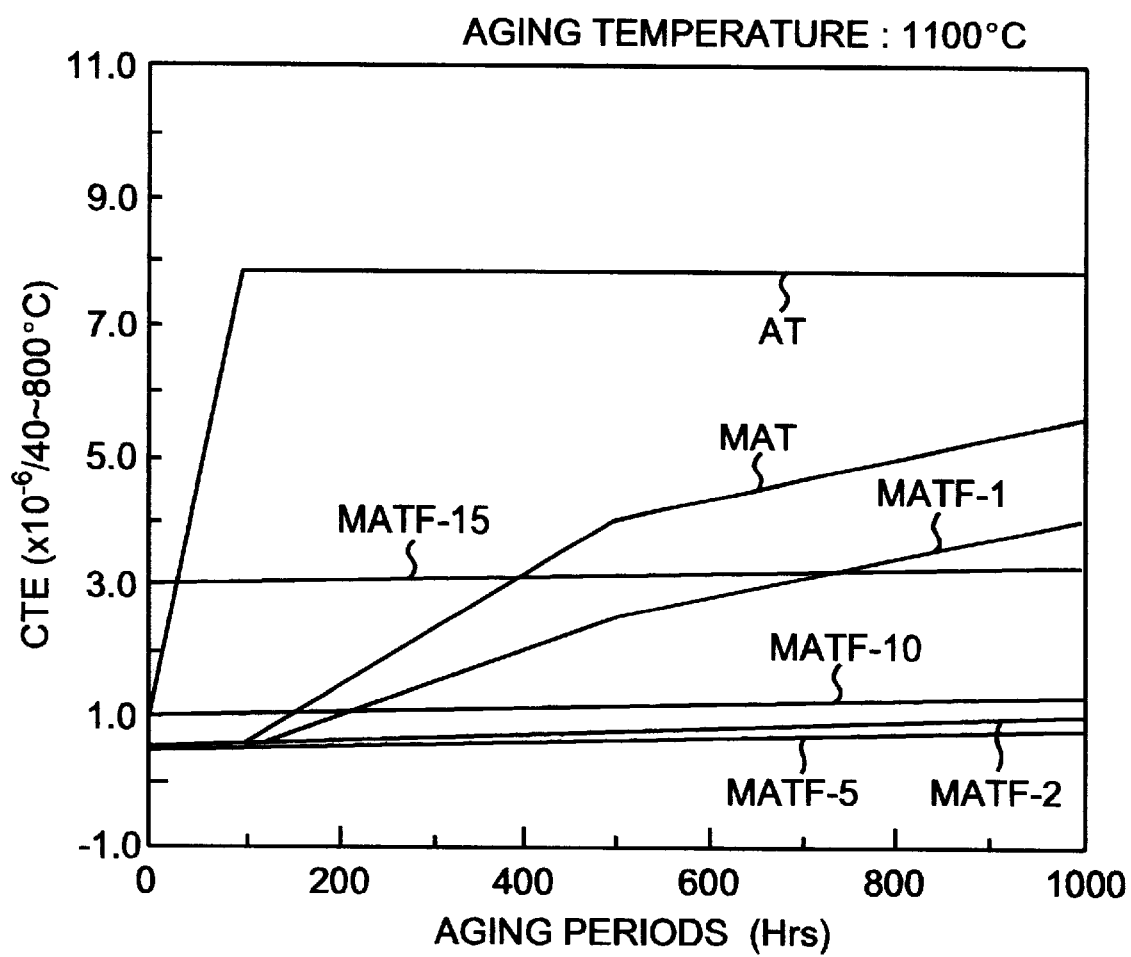
FIG. 10 is a graph showing a relation between aging time and thermal expansion coefficient of the aluminum-titanate honeycomb structural body by adding MgO and $Fe_2O_3$.

Then, FIG. 10 showed thermal expansion coefficients of the fired honeycomb structural bodies having various compositions after maintaining in a temperature of 1100° C. for respective aging times. As shown in FIG. 10, in the honeycomb structural bodies made of aluminum-titanate with no MgO and $Fe_2O_3$ addition (AT), the thermal expansion coefficient was rapidly increased by a heat treatment for a short period. Moreover, in the honeycomb structural bodies in which is 10 wt % of MgO was added in aluminum-titanate (MAT), the thermal expansion coefficient was gradually increased by the heat treatment for a long period. Therefore, if the honeycomb structural bodies AT and MAT were used for a long time in a high temperature, the thermal coefficient was increased and thus there was a large possibility such that the honeycomb structural bodies were fractured.

Under such a condition, thermal expansion coefficients of honeycomb structural bodies in which MgO and $Fe_2O_3$ were added in aluminum-titanate (MATF) were measured after the heat treatment for a long period. in the honeycomb structural bodies in which 1 wt % of $Fe_2O_3$ was added (MATF-1), the thermal expansion coefficient was gradually increased. However, in the honeycomb structural bodies in which 2 wt % of $Fe_2O_3$ was added (MATF-2), the honeycomb structural bodies in which 5 wt % of $Fe_2O_3$ was added (MATF-5) and the honeycomb structural bodies in which 10 wt % of $Fe_2O_3$ was added (MATF-10), the thermal expansion coefficients were low and not increased by the heat treatment for a long to period. However, in the honeycomb structural bodies in which 15 wt % of $Fe_2O_3$ was added (MATF-15), the thermal expansion coefficient was not increased by the heat treatment for a long period, but it was high before the heat treatment, so that MATF-15 was not used preferably. It should be noted that 5 wt % of MgO was added in all the MATF series mentioned above. Therefore, it was understood that 2~10 wt % of $Fe_2O_3$ were preferably added in aluminun-titanate.

As can be understood from, the embodiment 5, it is preferred to add 4~10 wt % of MgO and 2~10 wt % of $Fe_2O_3$ in the aluminum-titanate honeycomb structural bodies. Moreover, in the embodiments mentioned above, as for raw materials such as cordierite, mullite, aluminum-titanate and so on which construct the honeycomb structural bodies at the high temperature portion, the middle temperature portion and the low temperature portion, use is made of raw materials generally used, chamotte and so on or a combination thereof.

What is claimed is:

1. A honeycomb regenerator for recovering waste heat in an exhaust gas by passing an exhaust gas and a gas to be heated alternately therethrough, said honeycomb structural regenerator, comprising:

first honeycomb structural bodies comprising aluminum-titanate as a main crystal phase or a combination of aluminum-titanate and mullite and being stable at a temperature of at least 1250° C.; and second honeycomb structural bodies, arranged adjacent said first honeycomb structural bodies in a direction parallel to a gas passing direction, comprising cordierite and/or mullite as a main crystal phase.

2. The honeycomb regenerator according to claim 1, wherein the size of said first honeycomb structural bodies along a perimeter portion thereof is smaller than the size of said first honeycomb structural bodies arranged at a center portion residing within the perimeter portion.

3. The honeycomb regenerator according to claim 1, wherein MgO and $Fe_2O_3$ are added in said aluminum-titanate.

4. A honeycomb regenerator for recovering waste heat in an exhaust gas by passing an exhaust gas and a gas to be heated alternately therethrough, said honeycomb structural regenerator, comprising:

first honeycomb structural bodies arranged in a first portion and comprising aluminum-titanate as a main crystal phase or a combination of aluminum-titanate and mullite;

second honeycomb structural bodies, arranged in a second portion adjacent said first honeycomb structural bodies in a direction parallel to a gas passing direction, comprising alumina as a main crystal phase and being stable at a temperature of at least 1250° C.; and third honeycomb structural bodies, arranged in a third portion adjacent said second honeycomb structural bodies in a direction parallel to a gas passing direction, comprising at least one material selected from the group consisting of cordierite, mullite and a porcelain having a corrosion resistivity.

5. The honeycomb regenerator according to claim 4, wherein said first honeycomb structural bodies comprise aluminum-titanate as a main crystal phase, said second honeycomb structural bodies comprise alumina as a main crystal phase, and said third honeycomb structural bodies comprise cordierite as a main crystal phase.

6. The honeycomb regenerator according to claim 4, wherein said aluminum-titanate includes 4~10 wt % of MgO and 2~10 wt % of $Fe_2O_3$.

7. The honeycomb regenerator according to claim 6, wherein a thermal expansion coefficient of said first honeycomb structural bodies comprising aluminum-titanate as a main crystal phase or a combination of aluminum-titanate and mullite is under $1.0 \times 10^{-6}$/° C. in a temperature range of 40~800° C.

8. The honeycomb regenerator according to claim 4, wherein said third honeycomb structural bodies comprise porcelain honeycomb structural bodies located at a position wherein, when exhaust gas is passing therethrouqh, a temperature is under a dew point of an acid included in said exhaust gas.

9. The honeycomb regenerator according to claim 4, wherein a dimension of said first honeycomb structural bodies along a perimeter portion to which an exhaust gas having a high temperature may be contacted is smaller than that of said first honeycomb structural bodies arranged at a center portion.

\* \* \* \* \*